Nov. 6, 1962 F. R. BALCAR ETAL 3,062,017
OXYGEN DISPENSING
Filed Sept. 30, 1959 3 Sheets-Sheet 1

INVENTORS
FREDERICK R. BALCAR
WALTER B. MOEN
BY
Milford F. Lietje
Agent

Nov. 6, 1962

F. R. BALCAR ETAL 3,062,017

OXYGEN DISPENSING

Filed Sept. 30, 1959

INVENTORS
FREDERICK R. BALCAR
WALTER B. MOEN
BY

*Milford F. Pietz*
Agent

Nov. 6, 1962    F. R. BALCAR ETAL    3,062,017
OXYGEN DISPENSING
Filed Sept. 30, 1959    3 Sheets-Sheet 3

INVENTORS
FREDERICK R. BALCAR
WALTER B. MOEN
BY
Melford F. Pietz
Agent 3,062,017
OXYGEN DISPENSING
Frederick R. Balcar, Millington, and Walter B. Moen, Berkeley Heights, N.J., assignors to Air Reduction Company, Incorporated, New York, N.Y., a corporation of New York
Filed Sept. 30, 1959, Ser. No. 843,492
16 Claims. (Cl. 62—50)

This invention relates to a system and a process for supplying a gaseous stream of a cryogenic substance, i.e. an element or compound having a boiling point below −150° C. More specifically the invention relates to a system and a process for supplying gaseous oxygen, particularly for supplying oxygen in a form suitable for use by personnel aboard an aircraft, a space ship, or other vehicle in which an artificial atmosphere must be available to sustain life.

It is customary in aircraft flying at high altitudes to provide a supply of oxygen adapted to be connected to oxygen masks or like apparatus for used by the crewmen or passangers aboard when the existing atmosphere does not contain adequate oxygen to supply the normal needs of the human respiratory system. Oxygen supply systems for this purpose are generally of the type involving a liquid oxygen "converter" which is composed of a reservoir containing liquid oxygen which is gradually withdrawn and vaporized or gasified to provide the necessary oxygen in gaseous form. The reservoir is provided with pipes, valves, and other components for converting the liquid oxygen into gaseous form and supplying it under the desired pressure for the use indicated. The conventional oxygen converter system has the advantage that it has relatively low weight and space requirements per unit of oxygen gas delivered compared with other known oxygen sources. While such systems are, therefore, generally satisfactory under normal flying conditions, as higher and higher altitudes are reached and the action of gravity is gradually reduced, with the possibility of reaching zero gravity, problems arise in connection with the operation of known oxygen supply systems and their effectiveness under service conditions is impaired. Furthermore, even in normal altitude operation, modern aircraft, when flying at high velocities and when undergoing rapid maneuvers, create sudden changes in gravity loadings which similarly adversely affect the operation of heretofore available oxygen supply systems of the character indicated.

Conventional liquid-oxygen converters require gravity for reliable operation, whereas a vehicle directed into the rarified portions of the earth's atmosphere, and beyond, or subjected to sudden changes in direction even at lower altitudes, will encounter a wide variety of negative and positive accelerations including, in the case of prolonged travel away from the earth, a condition where there is a complete lack of an apparent gravitational field.

A nonwetting liquid such as oxygen, in the absence of a gravitational force, would tend to form a large spherical "drop" because of surface tension effects. If the liquid were in a container, the "drop" would presumably move about randomly because of small motions imparted by the vehicle, and as the result of collisions with the container walls would be dispersed into smaller droplets. In general, a sample of a volume element within the container could not be depended upon to consist of liquid or gas since it could at any given moment be in either phase, or a mixture of both phases. This creates serious problems with respect to providing a valve and control system in a conventional liquid oxygen converter system for withdrawing the oxygen and a heat exchanger for elevating the temperature of the oxygen to a useable level for ventilation and breathing. In conventional converters the oxygen exists in two phases (gas and liquid) and the delivery tube if adapted for gas discharge will not function if liquid enters it, and if adapted for liquid discharge, it will not function properly if gas enters.

Furthermore, operation under the gravity conditions indicated above creates additional problems in the provision of heat exchangers for warming and vaporizing the liquid oxygen. A conventional oxygen converter uses a tube coil for warming the oxygen. Heat exchange through such a coil is largely by natural convection, and natural convection depends upon gravity. In the absence of gravity, heat transfer by natural convection would cease and heat would be transferred only by radiation unless forced convection were induced by fans or blowers. Similar problems are also encountered when an attempt is made to supply a gaseous stream of other cryogenic substances.

There is, therefore, an important need for a method of supplying a cryogenic substance such as oxygen and for a supply system which are effective in operation and which are at the same time independent of the strength of the gravitational field without excessive space and weight requirements per unit of oxygen or other cryogenic substance delivered.

It is an object of the present invention to provide a system for supplying a continuous stream of gaseous oxygen which avoids the drawbacks and disadvantages of conventional liquid oxygen converters, particularly under conditions of varying and minimum gravitational fields.

It is another object of the invention to provide a gaseous oxygen supply system of the character indicated which is light in weight and occupies a minimum amount of space.

It is a further object of the invention to provide a system for supplying gaseous oxygen which has the advantages of known liquid-oxygen converters with respect to size and weight but which is fully effective in operation regardless of the strength and nature of the gravitational field to which it may be exposed.

It is another object of the invention to provide a method of supplying a continuous stream of gaseous oxygen for use in breathing apparatus and the like which does not rely upon a positive gravitational field for its effectiveness.

It is a further object of the invention to provide a method of supplying oxygen in a vehicle which may be subjected to a wide variety of negative and positive accelerations without variance in its effectiveness.

It is another of the invention to provide a system of the character indicated in which loss of oxygen by vaporization is minimized. It is a further object of the invention to provide a system and a method for supplying gaseous streams of other cryogenic substances.

In accordance with the invention, as applied specifically to oxygen, there is provided a method of continuously supplying gaseous oxygen which comprises the steps of establishing in a confined thermally-insulated zone a body of oxygen entirely in a single phase at a uniform density within the range of about 25 to 70 pounds per cubic foot and at a predetermined pressure above 730 pounds per square inch absolute (p.s.i.a.) and at a temperature within the range of about −175° F. to −300° F., preferably about −182° F. to −297° F., with the pressure preferably in the raneg of 735 to 1000 p.s.i.a., the pressure at all times being sufficient that the oxygen will be in a single phase, and therefore of the specified uniform density, throughout the confined zone, gradually withdrawing the single phase oxygen from the confined zone at the pressure maintained in the zone and supplying it at a lower pressure, heating it exteriorly of said zone to a comfortable breathing temperature, e.g. above 32° F. and preferably about 60° F., and maintaining the oxygen at the predetermined pressure in the confined zone during the period of withdrawal as by supplying heat to the oxygen in the confined zone in amounts sufficient to restore any loss of pressure resulting from the withdrawal. The body of oxygen in single phase in the confined zone is advantageously initially established by introducing liquid oxygen at atmospheric pressure into the zone and, when it is desired to initiate the supply of gaseous oxygen, the liquid oxygen is heated in the confined zone until the pressure is at least 730 p.s.i.a., from which point the oxygen will exist entirely in a single phase, and can be withdrawn while being maintained at a substantially constant predetermined pressure as described above. While the predetermined pressure may lie in the above-indicated range, it is preferably close to 730 p.s.i.a., and 800 p.s.i.a. is a typical suitable pressure.

The apparatus of this invention by means of which the foregoing process may be particularly efficiently carried out comprises a container, suitably a vacuum-jacketed flask such as a container in the nature of a Dewar flask, which is adapted to contain a body of oxygen in single phase at the predetermined pressure above 730 p.s.i.a., a conduit for supplying the oxygen at the predetermined pressure to a pressure-reducing device which supplies the oxygen at any desired lower pressure for direct use, means for sensing any reduction in the predetermined pressure in the confined zone, heating means activated by the sensing means to heat the oxygen in the container to the predetermined pressure value, and heating means to raise the temperature of the withdrawn oxygen to a value above 32° F., e.g. 60° F.

It is a feature of the invention that oxygen in the confined thermally-insulated zone is in a single phase with the possibility of phase-discontinuity interfering with control of the system eliminated.

It is a further feature of the invention that operation is effected at a substantially constant pressure but without the need for excessive pressures requiring heavy, cumbersome equipment.

It is another feature of the invention that the process and apparatus for delivering oxygen for use in a vehicle avoids the disadvantages of liquid-oxygen converters heretofore used with little or no weight or volume penalty.

It is another feature of the invention that positive expulsion and dispensing of oxygen are effected continuously under all gravitational field conditions.

Other objects and features of the invention will be readily apparent from the following detailed description and from the accompanying drawings wherein, FIG. 1 is an elevational view, partly in section, of a system for continuously supplying gaseous oxygen or other cryogenic substance embodying features of the present invention;

Figure 1:
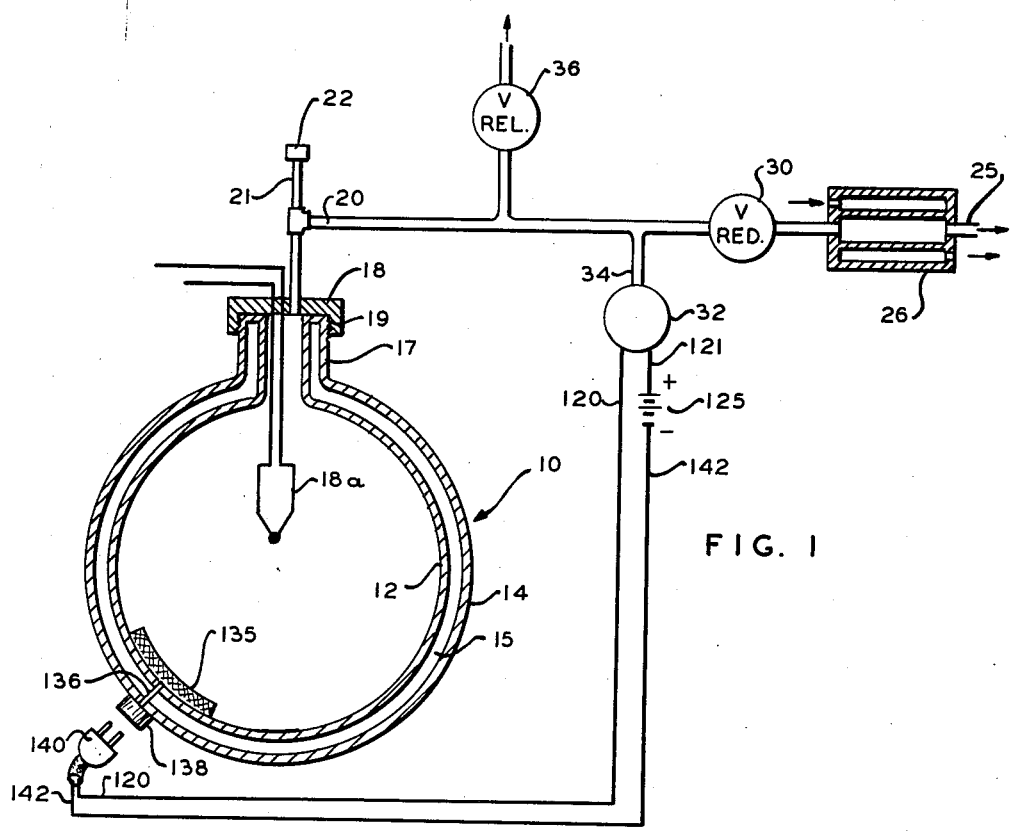
Figure 6:
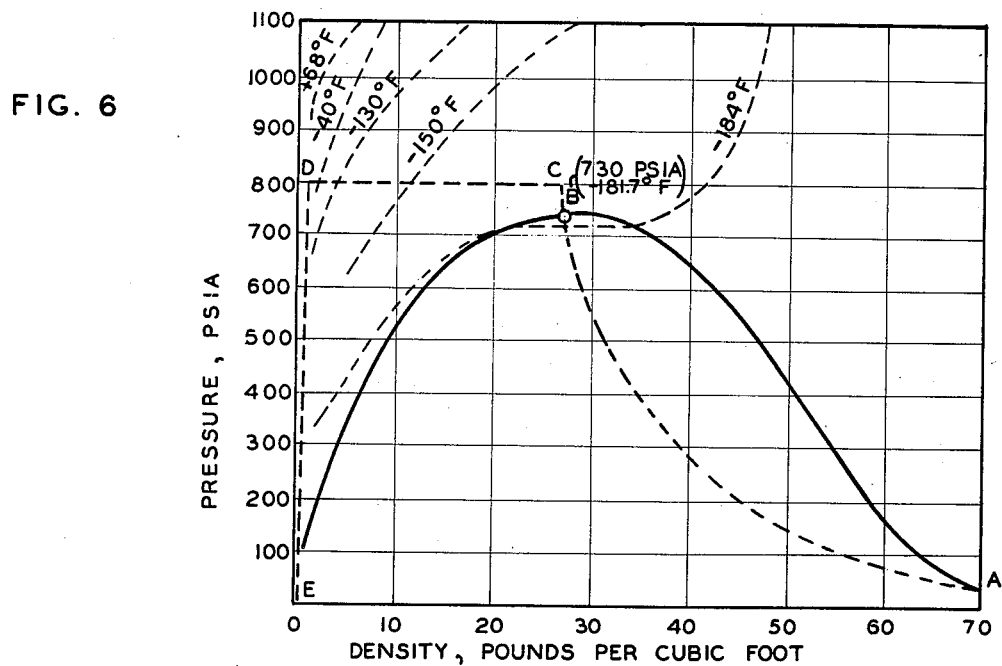
Figure 5:
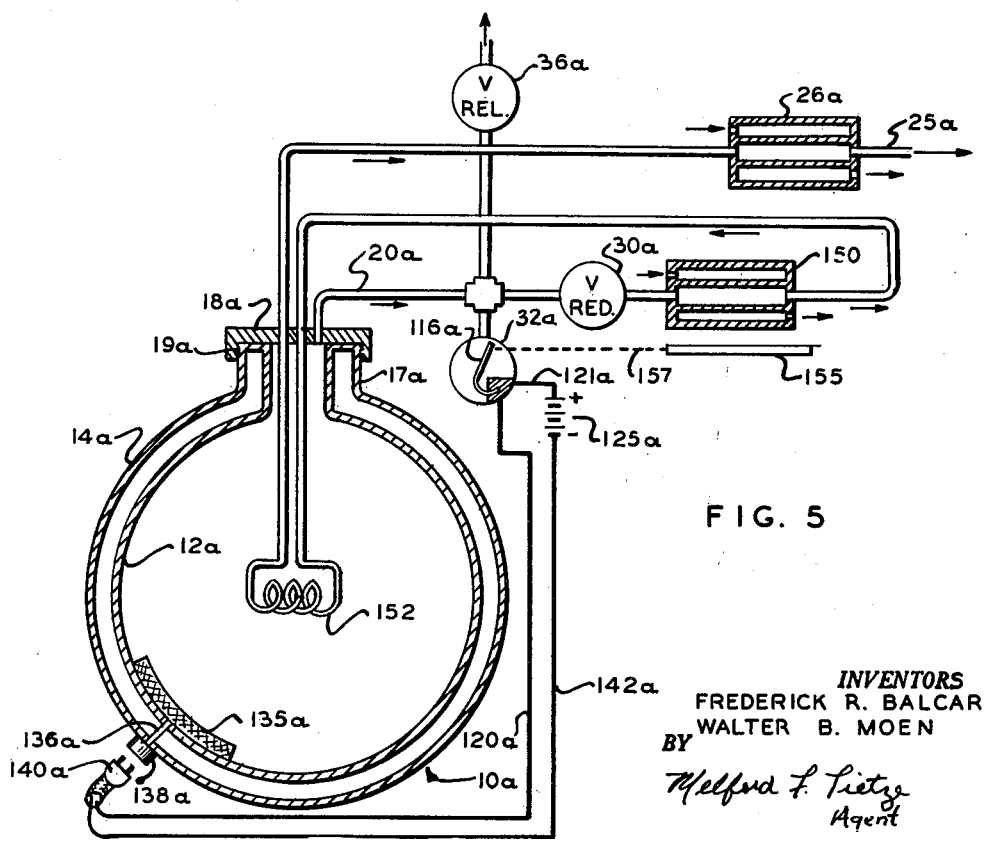

FIG. 5 is an elevational view similar to FIG. 1 showing another embodiment of a system for supplying oxygen or other cryogenic substance embodying features of the invention; and FIG. 6 is a graph illustrating the pressure and temperature conditions existing in the system in carrying out the process of the invention. The system illustrated in the drawings will not be described with specific reference to the supplying of gaseous oxygen but it will be understood that it is also suitable for use in supplying gaseous streams of other cryogenic substances.

Referring to the drawings, and more particularly to FIG. 1, the system illustrated includes a container 10 suitably constructed in the form of a vacuum flask, e.g. a Dewar flask, with a spherical inner shell 12 resistant to the operating pressures, an outer shell 14, advantageously formed with a heat-reflecting outer surface, and an evacuated interposed vacuum space 15 suitably at an absolute pressure of about 0.1 mm. of mercury, or below. In a specific illustrative embodiment, a vacuum flask of 5-liter capacity suitably has an inner shell 12 formed from 14-gauge stainless steel and an outer shell 14 formed from silvered 14-gauge steel. The space 15 may also contain solid thermal insulation such as foamed resins and like known insulating material. As shown, the container 10 is formed with a neck 17 closed by a cap 18 connected to the neck as by threads 19. A filling line 21 closed by a cap 22 communicates with a line 20 connected to container 10. Line 20 serves as a draw-off conduit and suitably has an internal diameter of $\frac{3}{16}$ in. and is formed from stainless steel, copper, or other like material suitable for the conduction of single-phase oxygen. The free end 25 of line 20 is adapted to be connected to the usual oxygen mask or other consuming apparatus (not shown) in conventional manner to supply gaseous oxygen to such apparatus at a predetermined pressure.

Interposed in the line 20 between the container 10 and the discharge end 25 are a pressure-reducing valve and a heat exchanger of any convenient form to raise the temperature of the single-phase oxygen and convert it to gaseous oxygen at a temperature and pressure convenient for breathing. The pressure-reducing or regulator valve 30 receives the single-phase oxygen at substantially the pressure prevailing in the container 10 and discharges it at the pressure required by the consuming apparatus, e.g. 5–60 p.s.i.a., preferably 5–15 p.s.i.a.

Upstream of the pressure-reducing valve 30 is a pressure controller 32 which is connected into the line 20 by a branch 34 so that it is subjected to the line pressure prevailing ahead of valve 30, i.e. the pressure of the oxygen in container 10. Also connected in the draw-off line 20 is a pressure-relief valve 36 of any conventional construction adapted to be set at a predetermined value slightly above the pressure to be maintained, both for protecting the equipment by preventing the building up of an excessive pressure in the single-phase oxygen system and for controlling the amplitude of pressure fluctuations during operation.

The heat exchanger 26 may take conventional form. For example, in many cases a coil exposed to the ambient atmosphere with suitably-induced convection is sufficient. If the installation will encounter an ambient atmosphere at low temperature, then the heat exchanger may include the positive circulation of a warm gas or liquid in indirect heat exchange with the oxygen.

Figures 3, 4:
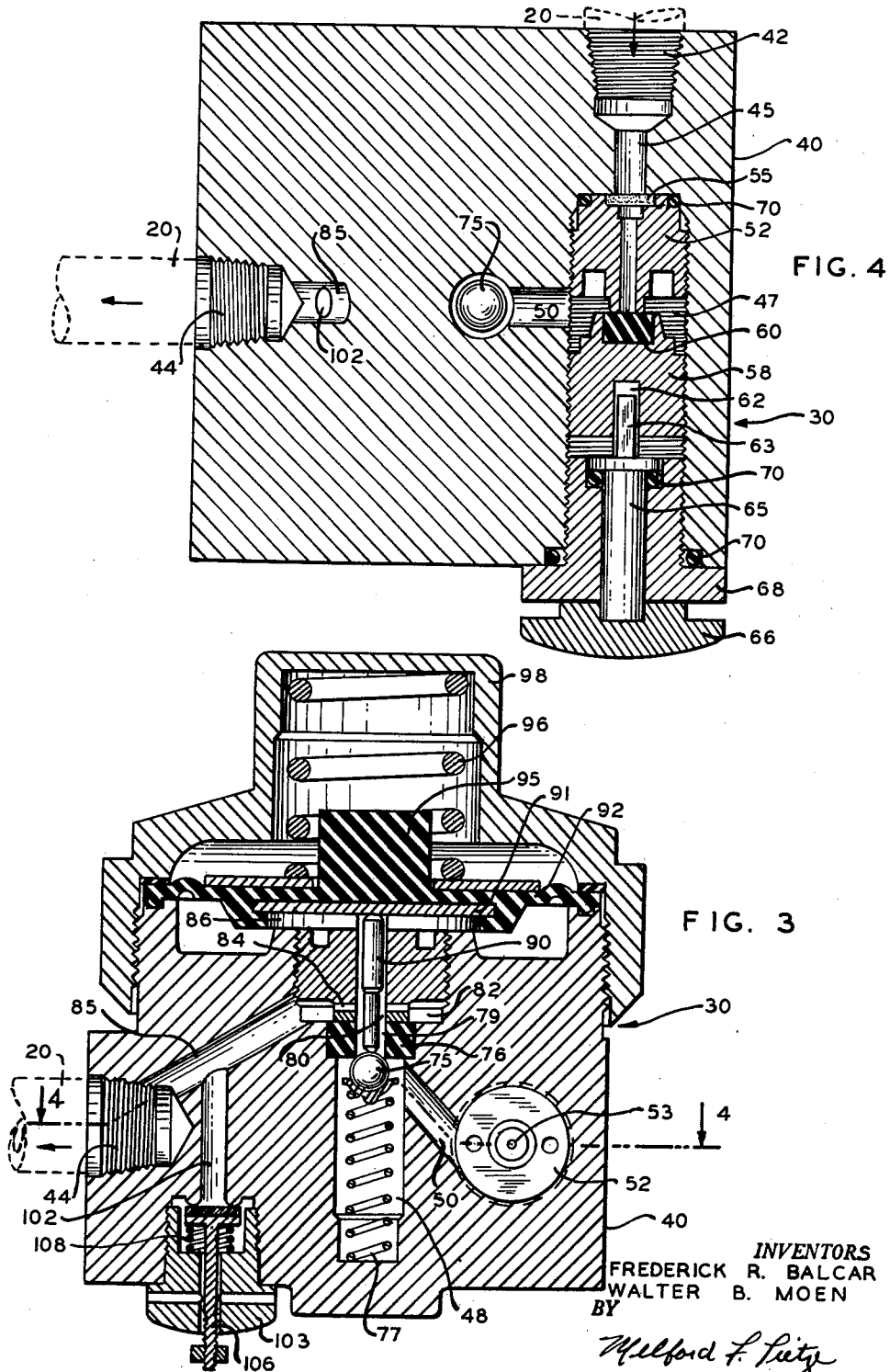
FIG. 3 is a vertical sectional view of a pressure regulator or reducer of a type also adapted for use in the FIG. 1 system.
FIG. 4 is a horizontal sectional view of the regulator shown in FIG. 3, as seen approximately along the line 4—4.

The pressure-reducing valve 30 may similarly be of any convenient construction adapted to receive single-phase oxygen at a relatively high pressure from container 10 and to discharge it at a pressure within the range of about 5 to 60 p.s.i.a., but a particularly suitable and effective construction of the valve 30 is shown by way of example in FIGS. 3 and 4. As seen in these figures the valve 30 has a main body 40 formed with an inlet 42 connected with the upstream portion of draw-off line 20 and an outlet 44 connected with the downstream portion of line 20 leading to heat exchanger 26 and discharge end 25. A channel 45 leads to a valve chamber 47 which communicates with a second valve chamber 48 by channel 50. In chamber 47 is valve-seating unit 52 with a filter 55, and a valve member 58 with washer 60 and a slot 62 receiving tongue 63 of valve stem 65 having handle 66 rotatable in packing nut 68, sealing being effected by O rings 70. The supply of oxygen entering into chamber 47 from inlet 42 is thus readily controlled by appropriate rotation of handle 66. Valve chamber 48 has a ball valve 75 and a coil spring 77. A valve seat 76 has a bore 79 communicating with bore 80, recess 82, passageways 84, channel 85 and recess 86.

Stem 90 engages a plate 91 in a resilient diaphragm 92 with a boss 95 surrounded by a spring 96 in cap 98. To prevent accidental increase of oxygen pressure at the outlet of valve 30 appreciably beyond the predetermined outlet pressure, a safety-release valve communicates with outlet pressure through channel 102. This valve consists of an apertured plug 103, a stem 106, and a spring 108 which is selected to correspond to the release pressure.

In the operation of valve 30, oxygen enters inlet 42 and chamber 47 at a rate corresponding to the position of valve member 52. Generally a flow of 0.3 to 5 liters (STP) per minute is suitable. This oxygen, at the pressure upstream of valve 30, passes into chamber 48. Spring 96 is selected to exert a pressure on diaphragm 92 corresponding to the discharge pressure desired, e.g. a pressure within the range of 5-60 p.s.i.a. When this pressure exists in the outlet portion of the valve, ball 75 is held against its seat by spring 77. When this pressure falls slightly spring 96 moves diaphragm 92 downwardly, stem 90 displacing ball 75, and oxygen at the upstream pressure flows into channel 85 until the desired pressure is restored, then the ball 75 closes and the cycle is repeated. Thus, by appropriate selection of the spring 96, the pressure of the discharged oxygen is automatically and continuously regulated at the desired value regardless of the value of the pressure of the oxygen upstream of valve 30.

Figure 2:
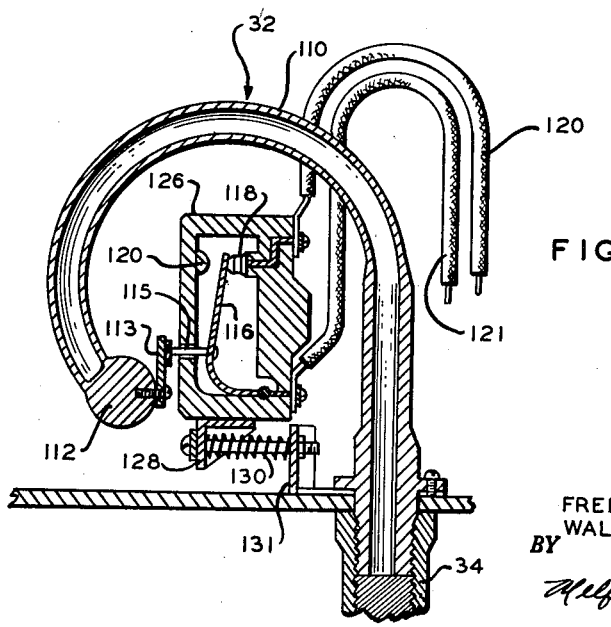
FIG. 2 is a sectional view on an enlarged scale of a pressure controller or switch suitable for use in the system of FIG. 1.

The pressure controller 32 may, like the valve 30, also be of any convenient form suitable for making or breaking an electric circuit in response to deviations from a predetermined pressure, but there is shown in FIG. 2 a form of pressure controller which is particularly suitable for use in the system of this invention. The controller shown in FIG. 2 is in the nature of a Bourdon tube type of pressure-actuated switch and, as shown, comprises a tube 110 having a curved portion of a gradually-decreasing diameter in the direction of a terminal foot 112 which carries a plate 113 positioned to engage a switch-actuating element 115 acting upon a switch lever 116 positioned to move between a contact 118 and a stop 120, the lever 116 being of the snap-action type. Contact 118 and lever 116 are connected to lead wires 120 and 121, respectively, of a circuit including a source of electric power indicated by the battery 125 shown in FIG. 1. The inlet of tube 110 is connected with branch line 34. The switch is in a casing 126 mounted upon a bracket 128 which is carried by a spring urged bolt 130 engaged with a plate 131. The relative relationship between casing 126 and the end of tube 110 is readily varied by turning bolt 130 to adjust controller 32 to the desired pressure to be maintained. The controller 32 may thus be adjusted to energize or de-energize the circuit of leads 120 and 121 in response to deviations from any predetermined pressure. Thus, when the pressure increases in tube 110, it tends to straighten out or unroll the tube so that knob 112 moves away from element 115 and allows the snap-action switch arm 116 to move away from contact 118, thereby breaking the circuit. On the other hand, when the pressure in tube 110 decreases, tube 110 tends to roll back to its initial curved position, thereby moving the switch arm 116 into engagement with contact 118 to make the circuit again.

The purpose of the pressure controller 32 is to sense any drop in pressure in the system upstream of valve 30 and to energize heating means to increase the temperature of the single-phase oxygen in container 10 to restore the pressure to its predetermined value. As shown in FIG. 1, the inner shell 12 of the container 10 is provided with a resistance heating element 135 of any convenient form, preferably having as small a weight as possible but serving, upon energization of the circuit in which it is contained, to supply heat to the contents of the inner shell 12. The resistance element 135 is shown in greatly exaggerated size in the drawing and may vary widely in shape or in extent of coverage of the surface area of the shell 12. Leads 136 from resistance element 135 pass through sealed openings in the wall of shells 12 and 14 and are connected with a receptacle 138 adapted to receive a conventional two-pronged plug 140 for connecting the heating unit 135 to the source of electric power, e.g. the battery 125. The lead 120 from the pressure controller 32 is connected to plug 140, which is also connected by means of lead 142 to battery 125. As a result, when the pressure controller makes the electric circuit, the heating unit 135 is energized, and when the controller 32 breaks the circuit, the heating unit 135 is de-energized. While a direct connection from the power source through the controller to the heating unit has been shown, it will be understood that a relay may be interposed in the line to be actuated by the controller switch, if desired. Furthermore, the nature of the heating unit will be influenced by the delivery rates to be required of the system. For example, the heat input to maintain a constant pressure at a maximum delivery rate of 5 liters of oxygen, calculated at standard temperature and pressure, is 0.61 B.t.u./min. or 10.7 watts.

In using the above-described oxygen supply system, and in carrying out the process of the present invention to supply oxygen in gaseous form, the container 10 is first charged at atmospheric pressure with liquid oxygen, suitably at a temperature of about −297° F. The container may be completely filled, or only partially filled, and in a typical suitable operation it is 55% filled with liquid oxygen. From a practical standpoint, the container is generally not filled with less than about 50% of its capacity of liquid oxygen, although smaller amounts are operable, including for example a 25% filling. The oxygen may be introduced into the free open container or through line 21. The container is then engaged with the cap 18, or the cap 22 is applied, and the container is then allowed to stand until it is desired to begin withdrawal of oxygen. It is one of the advantages of the system described that although there is some small inflow of heat, i.e. heat-leak, to the contents of the container at this point, this does not result in loss of oxygen because the resultant vaporization of liquid oxygen merely serves to build up the pressure to the operating level. For example, if the container is initially 55% filled with liquid oxygen at −297° F., it will be 135 hours before the normal operating pressure of the container is reached. No loss of oxygen will occur during this period and thus the container 10 may be charged with liquid oxygen several days in advance of its intended use as a source of gaseous oxygen and left untended until it is needed. When, however, it is desired to place the system in readiness for supplying a continuous stream of gaseous oxygen to an oxygen mask or like consuming apparatus, and to make possible the effective, efficient operation of the system under all gravity conditions, including zero gravity, the heating unit 135 is energized by engaging the plug 140 to connect the heating unit to the source of electric current provided by the battery 125 and the temperature of the contents of the shell 12 raised until a pressure of at least 730 p.s.i.a. is reached. The system is then operated at a predetermined pressure above 730 p.s.i.a. e.g. 800-900 p.s.i.a., the pressure controller 32 having been set to maintain the desired constant operating pressure, e.g., 800 p.s.i.a., and the safety valve 36 being set for actuation at a higher pressure, e.g. a pressure about 50 p.s.i.a. above the selected pressure for operation. When the temperature has been raised to the point that the pressure reaches the predetermined constant operating value, the controller 32 takes over and maintains this pressure. The oxygen will thus be completely in a single phase and will be free from the two-phase conditions provided by the mixture of gaseous oxygen and liquid oxygen found in conventional converters which, under low gravity conditions and under conditions of sudden change in gravity loadings, cause the problems referred to above.

As oxygen is then withdrawn by the user through the line 20 and the valve 30, the pressure in container 10 will tend to drop below the predetermined pressure above 730 p.s.i.a. This pressure drop will be sensed by pressure controller 32 and the controller will cause the electric circuit to be made and the heating unit 135 to be energized. Energization of the heating unit 135 will increase the temperature of the oxygen in container 10 and thus increase its pressure. This increase in pressure will be sensed by the pressure controller 32 and the heating unit will be de-energized when the predetermined pressure has been reached. This cycle will then be repeated from time to time while the pressure in the system is continuously maintained substantially at the predetermined value, the temperature always gradually increasing as room temperature is approached. This gradual increase in temperature is advantageous, since heat leakage into the container 10 will be substantially less than that into conventional oxygen converters which operate at a constant temperature of approximately −300° F. By means of a standard temperature-measuring device, such as a thermocouple 18a (FIG. 1) suitably inserted through the cap 18, the temperature of the contents of the container 10 may be continuously observed and thus the increasing values of the temperature as room temperature is approached may readily be used for gaging the contents of the container and unexpected exhaustion of the system will be avoided.

The graph of FIG. 6, in which pressure in p.s.i.a. is plotted against density of oxygen in pounds per cubic foot, shows by means of a broken line the change in density of the liquid oxygen initially charged at A at −297° F. by filling 55% of the volume of the confined container as the oxygen is heated to B (730 p.s.i.a., −181.7° F.). The line B—C shows the slight change in density in increasing the pressure from 730 to 800 p.s.i.a., and the line C—D at a typical constant operating pressure of 800 p.s.i.a. shows the change in density as the oxygen is withdrawn from the system while being maintained at the predetermined operating pressure, the density and pressure finally approaching zero as the container becomes exhausted and the temperature reaches room temperature. At this point, or slightly before, replacement with another container filled with liquid oxygen, or refilling of the existing container, as through line 21, becomes necessary. The curvature of line A—B will be different for different percentage charges of liquid oxygen into the confined container and the line will extend from A to the line C—D without passing through the point B. Thus, when the container is substantially 100% filled, the pressure-density line corresponding to line A—B will rise almost vertically from A to the intersection with the extension of line C—D. Similarly, at intermediate percentages of filling the pressure-density line will have a sharper curvature than line A—B shown. Line A—B, therefore, is merely illustrative of pressure-density values in the case of a container initially filled with liquid oxygen to 55% of its cubic capacity, which represents a typical embodiment of this invention.

While the electrical heating system described above is fully effective for all normal operations, it may be desired to have available an auxiliary heating means which is independent of electric power. There is illustrated in FIG. 5 an embodiment of the system for supplying oxygen or other cryogenic substance of the present invention which has been provided with a suitable auxiliary heating means. In FIG. 5, in which all parts corresponding to those shown in FIG. 1 have been given like reference numerals to which a has been added, the portion of the draw-off line 20 downstream of the valve 32a is passed through a radiant heat exchanger 150 and is then passed through cap 18a back into container 10a to form a coil 152 before passing to the discharge point 25a. The heat exchanger 150 may be of any convenient type adapted to transfer radiant heat energy to a fluid stream flowing through it. In order to bring the heat exchanger 150 under the control of the pressure controller 32a, a shutter or blind 155 which can selectively shut out the radiant energy is suitably provided, as indicated diagrammatically at the side of exchanger 150, and shutter 155 is then mechanically connected, as by the lever 157, to the switch arm 116a of the controller 32a. In this manner, when the switch arm is moved in response to a decrease in pressure, the blind 155 will expose the exchanger 150 to the radiant energy, and when the switch arm moves in the opposite direction when the desired pressure has been restored, the blind 155 will be moved to shut out the radiant energy. If desired, the heat exchanger 26a may also be of a type adapted to operate by radiant heat in the manner of exchanger 150. The system of FIG. 5 is in other respects like the system of FIG. 1 and includes, inter alia, container walls 12a, 14a, threaded neck 17a, 19a, relief valve 36a, pressure-reducing valve 30a, power source 125a, for use when power is available and for initial heating before take-off, power lines 120a, 121a and 142a, plug 140a and heating element 135a, with leads 136a and receptacle 138a. The system may also include a filling line (not shown) similar to line 21 in FIG. 1.

While the present invention has been particularly described above with reference to its application to the storage and dispensing of oxygen, and while the invention is of particular value and advantage when applied to oxygen, the invention is also, as previously indicated, applicable to the handling of other cryogenic substances, i.e. other normally-gaseous elements and compounds which have a boiling point below −150° C. at atmospheric pressure, such as argon, carbon monoxide, helium, hydrogen, methane, neon, nitrogen, and the like.

It will be understood that these other cryogenic substances have critical pressures and critical temperatures which differ from those of oxygen. As a result, when applying the process of the present invention to these other cryogenic substances, density, temperature and pressure values different from those specified above in connection with oxygen will prevail. Generally speaking, the minimum pressure maintained, in p.s.i.a., will substantially correspond to the critical pressure of the particular cryogenic substance being handled. Preferably, however, the minimum pressure is at least about 1% higher than the critical pressure and the maximum pressure is preferably a value about 35–40% higher than the critical pressure. Similarly, the temperature employed when the cryogenic substance is contained as a confined body in a single phase in accordance with the invention suitably ranges, in ° F., from a value about 5–10° above the critical temperature of the substance to a value about 100–150° lower than the critical temperature and preferably the temperature ranges from about the critical temperature to a value about 90–145° lower than the critical temperature.

In like manner, the density of the confined single-phase cryogenic substance may be generally defined as varying from about the value existing at the critical temperature and critical pressure to a value which is substantially greater than the first-mentioned value, and is, for example, 2 to 3 times greater.

To illustrate the application of the invention to nitrogen, for example, there is established in a confined thermally-insulated zone a body of nitrogen entirely in a single phase at a uniform density within the range of about 19 to 50 pounds per cubic foot and at a predetermined pressure above 492 pounds per square inch absolute and at a temperature within the range of about −225° F. to −325° F., preferably about −233° F. to −320° F., with the pressure preferably in the range of 500 to 735 p.s.i.a., the pressure at all times being sufficient that the nitrogen will be in a single phase, and therefore of the specified uniform density, throughout the confined zone. The single phase nitrogen is gradually withdrawn from the confined zone at the pressure maintained in the zone and is suitably supplied at a lower pressure, the nitrogen being maintained at the predetermined pressure in the confined zone during the period of withdrawal, as by supplying heat to the oxygen in the confined zone in amounts sufficient to restore any loss of pressure resulting from the withdrawal.

In like manner, when the invention is applied to argon, the body of argon entirely in a single phase is at a uniform density within the range of about 33 to 87 pounds per cubic feet and at a predetermined pressure above 705 pounds per square inch absolute and at a temperature within the range of about −175° F. to −310° F., preferably about −188° F. to −303° F., with the pressure preferably in the range of 715 to 1000 p.s.i.a., the pressure at all times being sufficient that the argon will be in a single phase.

Using carbon monoxide as a further example of a cryogenic substance, there is established, in accordance with the invention, a body of CO entirely in a single phase at a uniform density within the range of about 18 to 49 pounds per cubic foot and at a predetermined pressure above 507 pounds per square inch absolute (p.s.i.a.) and at a temperature within the range of about −210° F. to −315° F., preferably about −220° F. to −312° F., with the pressure preferably in the range of 515 to 725 p.s.i.a., the pressure at all times being sufficient that the CO will be in a single phase, and therefore of the specified uniform density.

Using methane as a still further example of a cryogenic substance, the process of this invention is applied to this compound by establishing a body of methane entirely in a single phase at a uniform density within the range of about 10 to 26 pounds per cubic foot and at a predetermined pressure above 672 pounds per square inch absolute (p.s.i.a.) and at a temperature within the range of about −112° F. to −265° F., preferably about −117° F. to −259° F., with the pressure preferably in the range of 680 to 950 p.s.i.a., the pressure at all times being sufficient that the methane will be in a single phase, and therefore of the specified uniform density.

As in the case of oxygen, the body of the cryogenic substance in single space in the confined zone under the conditions described above is advantageously initially established by introducing the cryogenic substance in liquid form at atmospheric pressure into the zone and, when it is desired to initiate the supply of gas, the liquid cryogenic substance is heated in the confined zone until the pressure is at least as high as the critical pressure, from which point the substance will exist entirely in a single phase and can be withdrawn while being maintained at a substantially constant predetermined pressure as described above.

The final lower pressure to which the gaseous stream of the cryogenic substance is reduced after being withdrawn from will depend upon the use to which it will be put. If the gas is not to be used for breathing, it will generally not be necessary to heat, although such heating may be effected if desired.

The apparatus described above and illustrated by way of example in the drawings is suitably used in the handling and dispensing of all cryogenic substances but if the cryogenic substance has a critical pressure substantially lower than that of oxygen the wall thickness of the container may be reduced if desired to effect a reduction in the total weight of the system. It must, however, be of sufficient thickness to withstand the pressures encountered. Similarly, the wall thickness is increased if pressures substantially greater than the maximum pressures referred to above in connection with oxygen are to be employed. It will also be understood that the pressure sensing devices and regulators are adjusted for each cryogenic substance being handled to correspond to the appropriate temperatures and pressures to be maintained.

It will be understood that various changes and modifications may be made without departing from the invention as defined in the appended claims. For example, in the embodiment of FIG. 5, the heat exchanger 26a may in some cases be eliminated, particularly when the heat requirements are not great, and a portion of the stream in line 20a issuing from heat exchanger 150 combined with the cryogenic gas in the portion of line 20a on the downstream side of the coil 152 to form a common effluent of cryogenic gas, the ratio between the streams being suitably adjusted by a thermostatic valve (not shown) of any desired type set at a desired temperature. Similarly, it will be understood that the process and system of this invention, while particularly suitable for the uses indicated above, may also be used wherever a supply of a cryogenic substance is desired which can be maintained for substantial periods of time with minimum loss from heat leak, such as in installations on or below ground, in submarines, and in various other vehicles.

It will also be understood that the apparatus of the invention is not limited to any specific materials of construction and any materials convenient for the purpose may be employed, it being appreciated that minimum weight is desirable in order that the ratio of apparatus weight per unit of cryogenic substance supplied is as low as possible. It is intended, therefore, that all matter contained in the foregoing description and in the drawings shall be interpreted as illustrative only and not as limitative of the invention.

This application is a continuation-in-part of our co-pending application Serial No. 769,668, filed October 27, 1958, now abandoned, and entitled "Oxygen Dispensing."

What is claimed is:

1. A method for providing a continuous supply of a cryogenic substance in gaseous form which comprises the steps of establishing in a confined zone a two-phase body of cryogenic substance, heating said two-phase body in said zone to convert the body of cryogenic substance into a body of cryogenic substance entirely in a single phase at a predetermined pressure above the critical pressure of said cryogenic substance, gradually withdrawing the single-phase cryogenic substance from the confined zone in said single phase and at the predetermined pressure and supplying it at a lower pressure, and maintaining the single-phase cryogenic substance in said confined zone at said predetermined pressure during the period of withdrawal by positively supplying heat to said substance to restore any loss of pressure resulting from the withdrawal, said heat being positively supplied to compensate for the reduction in pressure effected by said withdrawal and said positive supply of heat being discontinued when said predetermined pressure has been restored following withdrawal of single-phase substance.

2. A method for providing a continuous supply of a cryogenic substance in gaseous form which comprises the steps of establishing in a confined zone a two-phase body of said cryogenic substance, heating said two-phase body in said zone to convert said body into a body of said cryogenic substance entirely in a single phase at a predetermined pressure above the critical pressure of said substance, gradually withdrawing the single phase cryogenic substance from the confined zone in said single phase and at the predetermined pressure and supplying it at a lower pressure, and maintaining the cryogenic substance in said confined zone at said predetermined pressure during the period of withdrawal by positively supplying heat to the single-phase body of cryogenic substance in the confined zone in amounts sufficient to restore any loss of pressure resulting from the withdrawal, said heat being positively supplied to compensate for the reduction in pressure effected by said withdrawal and said positive supply of heat being discontinued when said predetermined pressure has been restored following withdrawal of single-phase substance.

3. A method for providing a continuous supply of a cryogenic substance in gaseous form which comprises the steps of establishing in a confined thermally-insulated zone a two-phase body of said cryogenic substance, heating said two-phase body in said zone to convert said two-phase body into a single-phase body of said cryogenic substance of uniform density at a pressure within the range of about 1% to about 40% above the critical pressure of said substance and at a temperature in the range of about 10° F. above and 150° F. below the critical temperature of said substance, gradually withdrawing the single-phase cryogenic substance from the confined zone at the predetermined pressure and supplying it at a lower pressure, and maintaining the cryogenic substance in said confined zone at said predetermined pressure during the period of withdrawal by supplying heat directly into the body of single-phase cryogenic substance in the confined zone in amounts sufficient to restore any loss of pressure resulting from the withdrawal.

4. A method for providing a continuous supply of a cryogenic substance in gaseous form which comprises the steps of establishing in a confined thermally-insulated zone a body of said cryogenic substance in liquid form substantially half filling said zone, allowing said body to remain in said zone for a prolonged period of time, heating said body of cryogenic substance in said zone to convert said liquid body into a single-phase body of said cryogenic substance of uniform density at a pressure above the critical pressure of said substance, gradually withdrawing the single-phase cryogenic substance from the confined zone at the predetermined pressure and supplying it at a lower pressure, and maintaining the cryogenic substance in said confined zone in said single phase and at said predetermined pressure during the period of withdrawal by positively supplying heat directly into the body of single-phase cryogenic substance in the confined zone in amounts sufficient to restore any loss of pressure resulting from the withdrawal, said heat being positively supplied to compensate for the reduction in pressure effected by said withdrawal and said positive supply of heat being discontinued when said predetermined pressure has been restored following withdrawal of single-phase substance.

5. A method for providing a continuous supply of gaseous oxygen which comprises the steps of establishing in a confined thermally-insulated zone a two-phase body of oxygen, converting said two-phase oxygen body of uniform density in the range of about 25 to 70 pounds per cubic foot at a pressure within the range of about 735 to 1000 pounds per square inch absolute and at a temperature in the range of about —175° F. to —300° F., gradually withdrawing the single-phase oxygen from the confined zone at the predetermined pressure and supplying it at a lower pressure, and maintaining the oxygen in said confined zone at said predetermined pressure by admitting heat thereto during the period of withdrawal.

6. A method for providing a continuous supply of a cryogenic substance in gaseous form which comprises the steps of establishing in a confined thermally-insulated zone a two-phase body of cryogenic substance, converting said two-phase body by admitting heat thereto into a single-phase body of said cryogenic substance of uniform density at a pressure within the range of about 1% to about 40% above the critical pressure of said substance and at a temperature in the range of about 10° F. above and 150° F. below the critical temperature of said substance, gradually withdrawing the single-phase cryogenic substance from the confined zone at the predetermined pressure and supplying it at a lower pressure, and maintaining the cryogenic substance in said confined zone at said predetermined pressure by admitting heat thereto during the period of withdrawal.

7. A method for providing a continuous supply of gaseous oxygen which comprises the steps of providing oxygen in a confined zone to produce a two-phase body of oxygen, heating said two-phase body of oxygen in said zone to convert the body of oxygen into a body of oxygen entirely in a single-phase at a predetermined pressure above 730 pounds per square inch absolute, gradually releasing the single-phase oxygen from the confined zone at the predetermined pressure and supplying it at a lower pressure, and positively supplying heat to the single-phase oxygen in said confined zone at said predetermined pressure during the period of release to restore any loss of pressure resulting from the release, said heat being positively supplied to compensate for the reduction in pressure effected by said release and said positive supply of heat being discontinued when said predetermined pressure has been restored following release of single-phase oxygen.

8. A method for providing a continuous supply of gaseous oxygen which comprises the steps of introducing liquid oxygen into a confined zone to provide a two-phase body of oxygen, heating said two-phase body of oxygen in said zone to convert said body into a body of oxygen entirely in a single-phase at a predetermined pressure above 730 pounds per square inch absolute, gradually releasing the single phase oxygen from the confined zone at the predetermined pressure and supplying it at a lower pressure, and positively supplying heat to the single-phase body of oxygen in the confined zone in amounts sufficient to restore any loss of pressure resulting from the release to maintain said oxygen in said confined zone at said predetermined pressure during the period of release, said heat being positively supplied to compensate for the reduction in pressure effected by said release and said positive supply of heat being discontinued when said predetermined pressure has been restored following release of single-phase oxygen.

9. A method for providing a continuous supply of gaseous oxygen which comprises the steps of introducing liquid oxygen into a confined thermally-insulated zone to provide a two-phase body of oxygen, heating said two-phase body of oxygen in said zone to convert said two-phase oxygen body into a single-phase body of oxygen of uniform density in the range of about 25 to 70 pounds per cubic foot at a pressure within the range of about 735 to 1000 pounds per square inch absolute and at a temperature in the range of about —175° F. to —300° F., gradually releasing the single-phase oxygen from the confined zone at the predetermined pressure and supplying it at a lower pressure, and supplying heat directly into the body of single-phase oxygen in the confined zone in amounts sufficient to restore any loss of pressure resulting from the release to maintain the oxygen in said confined zone at said predetermined pressure during the period of release.

10. A method for providing a continuous supply of gaseous oxygen which comprises the steps of introducing liquid oxygen into a confined thermally-insulated zone to provide a body of liquid oxygen substantially half filling said zone, allowing said body to remain in said zone for a prolonged period of time, heating said body of oxygen in said zone to convert said liquid oxygen body into a single-phase body of oxygen of uniform density at a pressure within the range of about 735 to 1000 pounds per square inch absolute, gradually releasing the single-phase oxygen from the confined zone at the predetermined pressure and supplying it at a lower pressure, and positively supplying heat directly into the body of single-phase oxygen in the confined zone in amounts sufficient to restore any loss of pressure resulting from the release to maintain the oxygen in said confined zone at said predetermined pressure during the period of release, said heat being positively supplied to compensate for the reduction in pressure effected by said release and said positive supply of heat being discontinued when said predetermined pressure has been restored following release of single-phase oxygen.

11. An oxygen supply apparatus comprising a container for holding single-phase oxygen at a pressure in excess of 730 p.s.i.a. and at a temperature less than −175° F., means for releasing single-phase oxygen from said container and converting it to gaseous oxygen at a reduced pressure and an increased temperature relative to the pressure and temperature of said single-phase oxygen in said container, and means responsive to temperature changes of the single-phase oxygen in said container for gauging the quantity of oxygen remaining in said container following incremental release of single-phase oxygen therefrom.

12. A method for providing a continuous supply of gaseous oxygen from a confined zone containing a two-phase body of oxygen, which comprises the steps of heating said two-phase body of oxygen in said zone to convert the body of oxygen into a body of oxygen entirely in a single-phase at a predetermined pressure above 730 pounds per square inch absolute, gradually releasing the single-phase oxygen from the confined zone at the predetermined pressure and supplying it at a lower pressure, and positively admitting heat to the single-phase oxygen in said confined zone at said predetermined pressure during the period of release to restore any loss of pressure resulting from the release, said heat being positively supplied to compensate for the reduction in pressure effected by said release and said positive supply of heat being discontinued when said predetermined pressure has been restored following release of single-phase oxygen.

13. A method for providing a continuous supply of gaseous oxygen which comprises the steps of introducing liquid oxygen into a confined thermally-insulated zone to provide a two-phase body of oxygen, converting said two-phase oxygen body into a single-phase body of oxygen of uniform density in the range of about 25 to 70 pounds per cubic foot at a pressure within the range of about 735 to 1000 pounds per square inch absolute and at a temperature in the range of about −175° F. to −300° F., gradually releasing the single-phase oxygen from the confined zone at the predetermined pressure and supplying it at a lower pressure.

14. A method for providing a continuous supply of a cryogenic substance in a gaseous form which comprises the steps of establishing in a confined zone a body of said cryogenic substance entirely in a single phase at a pressure in excess of the critical pressure of said substance and at a temperature less than a temperature of 10° F. above the critical temperature of said substance, withdrawing said single-phase cryogenic substance from said zone and supplying it in gaseous form at a reduced pressure and at an increased temperature relative to the pressure and temperature of said single-phase cryogenic substance in said zone, and measuring changes in the temperature of said single-phase cryogenic substance in said zone for gauging the quantity of said substance remaining in said zone following incremental withdrawals of said single phase substance therefrom.

15. A method of providing a continuous supply of a cryogenic substance in gaseous form which comprises establishing in a confined zone a body of said cryogenic substance entirely in a single phase at a uniform density having a temperature within the range of about 10° F. above to about 150° F. below the critical temperature of said substance and a pressure exceeding the critical pressure of said substance, withdrawing said single phase cryogenic substance from said confined zone and supplying it in gaseous form at a reduced pressure, and supplying heat to said single-phase cryogenic substance in said confined zone sufficient to maintain the pressure of said cryogenic substance in said confined zone above said critical pressure.

16. A method of providing a continuous supply of oxygen in gaseous form which comprises establishing in a confined zone a body of said oxygen in a single phase at a uniform density within the range of 25–70 pounds per cubic foot having a temperature within the range of about −175° F. to −300° F. and a pressure exceeding a minimum of 730 pounds per square inch absolute, withdrawing said single phase oxygen from said confined zone and supplying it in gaseous form at a reduced pressure, and supplying heat to said single-phase oxygen in said confined zone sufficient to maintain the pressure of said oxygen in said confined zone above 730 pounds per square inch absolute.

References Cited in the file of this patent

UNITED STATES PATENTS

| | | |
|---|---|---|
| 1,962,187 | Flock | June 12, 1934 |
| 2,255,747 | Jones | Sept. 16, 1941 |
| 2,377,342 | Holicer | June 5, 1945 |
| 2,464,835 | Thayer et al. | Mar. 22, 1949 |
| 2,515,835 | Preston | July 18, 1950 |
| 2,525,874 | Larzelere | Oct. 17, 1950 |
| 2,670,605 | Van Zandt et al. | Mar. 2, 1954 |
| 2,735,271 | Evans | Feb. 21, 1956 |
| 2,922,289 | Freeman | Jan. 26, 1960 |
| 2,934,910 | Tayler | May 3, 1960 |
| 2,970,452 | Beckman et al. | Feb. 7, 1961 |